(12) United States Patent
Parry

(10) Patent No.: US 6,470,232 B2
(45) Date of Patent: Oct. 22, 2002

(54) CUSTOMIZED WRAPPING PAPER KIOSK

(75) Inventor: Travis Parry, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 107 days.

(21) Appl. No.: 09/766,915

(22) Filed: Jan. 18, 2001

(65) Prior Publication Data

US 2002/0095237 A1 Jul. 18, 2002

(51) Int. Cl.⁷ .............................. G06F 17/00
(52) U.S. Cl. ............... 700/233; 700/231; 700/234; 700/235
(58) Field of Search ............... 700/231, 233, 700/234, 235, 232; 705/26

(56) References Cited

U.S. PATENT DOCUMENTS

| | | | |
|---|---|---|---|
| 5,036,472 A | 7/1991 | Buckley et al. | 364/479 |
| 5,038,293 A | 8/1991 | Goodman | 364/479 |
| 5,243,174 A | 9/1993 | Veeneman et al. | 235/381 |
| 5,455,668 A | 10/1995 | De Bock et al. | 355/326 R |
| 5,546,316 A | 8/1996 | Buckley et al. | 364/479.03 |
| 5,561,604 A | 10/1996 | Buckley et al. | 364/479.05 |
| 5,751,590 A | 5/1998 | Cannon et al. | 364/479.03 |
| 5,765,142 A * | 6/1998 | Allred et al. | 705/26 |
| 5,819,240 A | 10/1998 | Kara | 705/408 |
| 5,839,038 A | 11/1998 | Kopp et al. | 399/322 |
| 5,918,220 A | 6/1999 | Sansone et al. | 705/408 |
| 6,038,492 A * | 3/2000 | Nichols et al. | 700/232 |

OTHER PUBLICATIONS

Streetwise Software News release, "Get Personal With Holiday Wrapping Paper from Streetwise Software", Aug. 30, 1999, http://swsoftware.com/Presswrap.htm, visited Jun. 25, 2002.*

* cited by examiner

*Primary Examiner*—Christopher P. Ellis
*Assistant Examiner*—Gene O. Crawford
(74) *Attorney, Agent, or Firm*—James R. McDaniel

(57) ABSTRACT

This invention allows the user to prepare customized wrapping paper at a kiosk by downloading an image into the kiosk, selecting a wrapping paper background at the kiosk, selecting wrapping paper quality and dimensions at the kiosk, viewing the customized wrapping paper at the kiosk, and printing the customized wrapping paper at the kiosk.

10 Claims, 1 Drawing Sheet

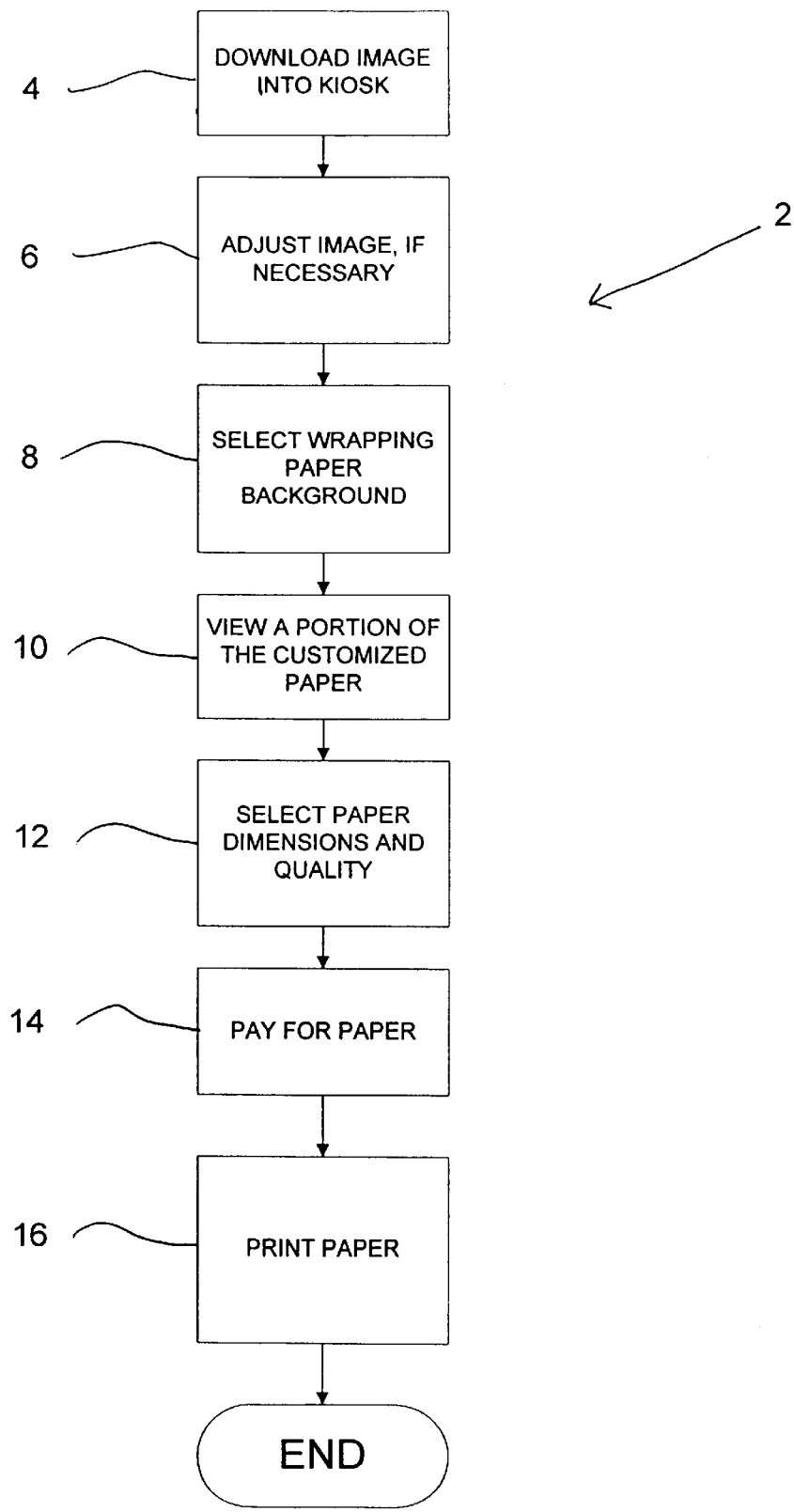
FIGURE

CUSTOMIZED WRAPPING PAPER KIOSK

FIELD OF THE INVENTION

This invention relates to kiosks. Such structures of this type, generally, allow the user to prepare customized wrapping paper at the kiosk.

DESCRIPTION OF THE RELATED ART

It is known, in the greeting card art, to employ a variety of computer-controlled machines for vending personalized products or the like. Exemplary of such prior art is U.S. Pat. No. 5,036,472 ('472) to S. P. Buckley et.al., entitled "Computer Controlled Machine for Vending Personalized Products or the Like," U.S. Pat. No. 5,546,316 ('316) to S. P. Buckley et.al., entitled "Computer Controlled System for Vending Personalized Products," U.S. Pat. No. 5,561,604 ('604) to S. P. Buckley et.al., entitled "Computer Controlled System for Vending Personalized Products," and U.S. Pat. No. 5,571,590 ('590) to T. G. Cannon et.al., entitled "System for Printing Social Expression Cards." While the '472, '316, '604, and '590 references employ a variety of computer-controlled machines for vending personalized products, such as greeting cards, none of these references teach a kiosk for preparing customized wrapping paper.

It is apparent from the above that there exists a need in the art for a kiosk, which is capable of preparing personalized products, but which at the same time is capable of producing customized wrapping paper. It is a purpose of this invention to fulfill this and other needs in the art in a manner more apparent to the skilled artisan once given the following disclosure.

SUMMARY OF THE INVENTION

Generally speaking, this invention fulfills these needs by providing a method for preparing customized wrapping paper, comprising the steps of: downloading an image into a kiosk; selecting a wrapping paper background substantially at the kiosk; selecting paper quality and dimensions substantially at the kiosk; viewing the customized wrapping paper substantially at the kiosk; and printing the customized wrapping paper substantially at the kiosk.

In certain preferred embodiments, the method also includes the steps of adjusting the image, if necessary and paying for the paper. Also, the image can be downloaded into a kiosk by squirting an image from the user's personal communication device (PCD) or downloading a pre-selected image located at the kiosk. Finally, the user can pay the attendant at the kiosk or by electronic billing.

In another further preferred embodiment, the kiosk allows the user to prepare customized wrapping paper, in which the user can employ pre-selected images or personalized images, a variety of backgrounds, and a variety of paper qualities and dimensions.

The preferred kiosk, according to this invention, offers the following advantages: ease-of-use; ability to utilize a variety of images; ability to utilize a variety of backgrounds; ability to utilize a variety of paper qualities and dimensions; ability to view the customized paper prior to printing; ability to utilize a variety of payment options; and good economy. In fact, in many of the preferred embodiments, these factors of ease-of-use, ability to utilize a variety of images, ability to utilize a variety of backgrounds, ability to utilize a variety of paper qualities and dimensions, ability to view the customized paper prior to printing; and ability to utilize a variety of payment options are optimized to an extent that is considerably higher than heretofore achieved in prior, known kiosks.

The above and other features of the present invention, which will become more apparent as the description proceeds, are best understood by considering the following detailed description in conjunction with the accompanying FIGURE and in which:

BRIEF DESCRIPTION OF THE DRAWINGS

The FIGURE is a flowchart that illustrates a method for preparing customized wrapping paper, according to one embodiment of the present invention.

DETAILED DESCRIPTION OF THE INVENTION

With reference to the FIGURE, there is illustrated one preferred embodiment for use of the concepts of this invention. In particular, method 2 for preparing customized wrapping paper at kiosk is illustrated. With respect to method 2, the user enters a kiosk and downloads an image to be printed on the customized wrapping paper, as shown in step 4. It is to be understood that the term "kiosk" refers to, but is not limited to, a small, lightweight structure with one or more open sides. This "kiosk", preferably, is located in an area of high people traffic, such as a mall, department store or the like. With respect to step 4, the user can download or squirt an image to be printed on the customized wrapping paper from a personal communication device (PCD) or choose a pre-selected image provided by the computer (not shown) at the kiosk. A PCD can be, but is not limited to, a personal digital assistant (PDA) or the like which is wirelessly connected to a variety of Internet websites. It is to be understood that the term "squirt" refers to the transmitting of a modulated carrier medium from the PCD to a receiver located in the kiosk that is capable of detecting/reading the modulated carrier medium. The carrier medium is modulated in such a way as to include computer executable instructions related to the image to be printed on the customized wrapping paper.

After the user has selected the image to be printed on the customized wrapping paper, the user can view the image at the computer located at the kiosk. The user can then adjust, if necessary, the image, as shown in step 6.

Once the user is satisfied with the image to be printed on the customized wrapping paper, the user can select from a variety of pre-selected backgrounds provided by the computer at the kiosk, as shown in step 8. Also, the user can "squirt" a background from the PCD.

After the user is satisfied with the image and background, the user can view a portion of the customized wrapping paper on the computer, as shown in step 10. If the user is not satisfied with either the image or the background, the user can backtrack to steps 6 and 8, respectively, in order to correct the image and/or the background.

Once the user is satisfied with the view of the image and background, the user can then select from a variety of paper dimensions and qualities available at the kiosk for use in printing the customized wrapping paper, as shown in step 12.

It is to be understood that the user could also bring along his/her own paper and insert that paper into the printer (not shown) located at or near the kiosk prior to the printing of the customized wrapping paper. The user may also decide to view the image and the background after they have been placed on the paper.

If the user is satisfied with the image, background, and paper dimensions and qualities, the user can then pay for the customized wrapping paper, as shown in step 14. It is to be understood that the user can pay an attendant located at or near the kiosk or the user can pay for the customized wrapping paper by electronic billing, such as through the use of a credit card/debit card reader located at or near the kiosk.

After the user has paid for the customized wrapping paper, the printer located at or near the kiosk will print the customized wrapping paper, as shown in step 16.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for preparing customized wrapping paper, comprising the steps of:

downloading an image into a kibsk, wherein said downloading step is further comprised of the step of; squirting an image from a personal communication device (PCD) to a computer located substantially adjacent to said kiosk;

selecting a wrapping paper background substantially at said kiosk;

selecting wrapping paper quality and dimensions substantially at said kiosk;

viewing said customized wrapping paper substantially at said kiosk; and printing said customized wrapping paper substantially at said kiosk.

2. The method, as in claim 1, wherein said method is further comprised of the step of:

adjusting, if necessary, said image.

3. The method, as in claim 1, wherein said step of downloading said image is further comprised of the step of:

choosing a pre-selected image.

4. The method, as in claim 1, wherein said PCD is further comprised of:

a personal digital assistant (PDA).

5. The method, as in claim 1, wherein said method is further comprised of the step of:

paying for said customized wrapping paper.

6. The method, as in claim 5, wherein said paying step is further comprised of the step of:

paying an attendant located substantially adjacent to said kiosk.

7. The method, as in claim 5, wherein said paying step is further comprised of the step of:

using electronic billing to pay for said customized wrapping paper.

8. A program storage medium readable by a computer, tangibly embodying a program of instructions executable by said computer to perform method steps for preparing a customized wrapping paper, said method steps comprising:

downloading an image into a kiosk, wherein said downloading step is further comprised of the step of; squirting an image from a personal communication device (PCD) to a computer located substantially adjacent to said kiosk;

selecting a wrapping paper background substantially at said kiosk;

selecting wrapping paper quality and dimensions substantially at said kiosk;

viewing said customized wrapping paper substantially at said kiosk; and printing said customized wrapping paper substantially at said kiosk.

9. The method, as in claim 8, wherein said method is further comprised of the step of:

paying for said customized wrapping paper.

10. The method, as in claim 8, wherein said method is further comprised of the step of:

adjusting, if necessary, said image.

* * * * *